United States Patent [19]

Bontempo

[11] Patent Number: 5,065,690
[45] Date of Patent: Nov. 19, 1991

[54] SWIMMING POOL LEAK DETECTOR

[76] Inventor: Donald T. Bontempo, 14 Haskell Ave., Everett, Mass. 02149

[21] Appl. No.: 573,677

[22] Filed: Aug. 27, 1990

[51] Int. Cl.$^5$ ............................................. G01M 3/20
[52] U.S. Cl. .................................. 116/264; 73/40.7; 222/465.1
[58] Field of Search ............ 116/264; 73/40.7, 864.13, 73/864.16; 222/175, 465.1

[56] References Cited

U.S. PATENT DOCUMENTS

| | | | |
|---|---|---|---|
| 1,693,737 | 12/1928 | Weldon | 73/40.7 X |
| 3,232,117 | 2/1966 | Gilmont | 73/864.13 |
| 3,273,402 | 9/1966 | Farr | 73/864.16 X |
| 4,464,941 | 8/1984 | Herold et al. | 73/864.13 |
| 4,566,313 | 1/1989 | Monten | 73/40.7 |

Primary Examiner—Daniel M. Yasich
Attorney, Agent, or Firm—Bromberg & Sunstein

[57] ABSTRACT

A swimming pool leak detector for locating water leaks in a filled swimming pool from a standing position (when the depth of the pool allows) within the swimming pool. The leak detector is machined to resemble a billiard cue and consists of two main parts: a receiver and a plunger. The receiver is machined from a solid plastic rod with a reservoir at its broadest end to accommodate the plunger. A channel is drilled from the tip of the leak detector to the reservoir. The reservoir is filled by submerging the tip of the leak detector into a dye solution (food coloring) and pulling outwardly on the plunger which draws the dye solution into the reservoir. The user then enters the filled swimming pool with the filled leak detector and tests for leaks by placing the tip of the leak detector closely to the point of investigation. By pressing downward on the plunger, a small stream of dye is released, and if a leak is present at the point of investigation, the suction caused by the leak draws the dye solution to the leak, thus pin-pointing the problem.

2 Claims, 1 Drawing Sheet

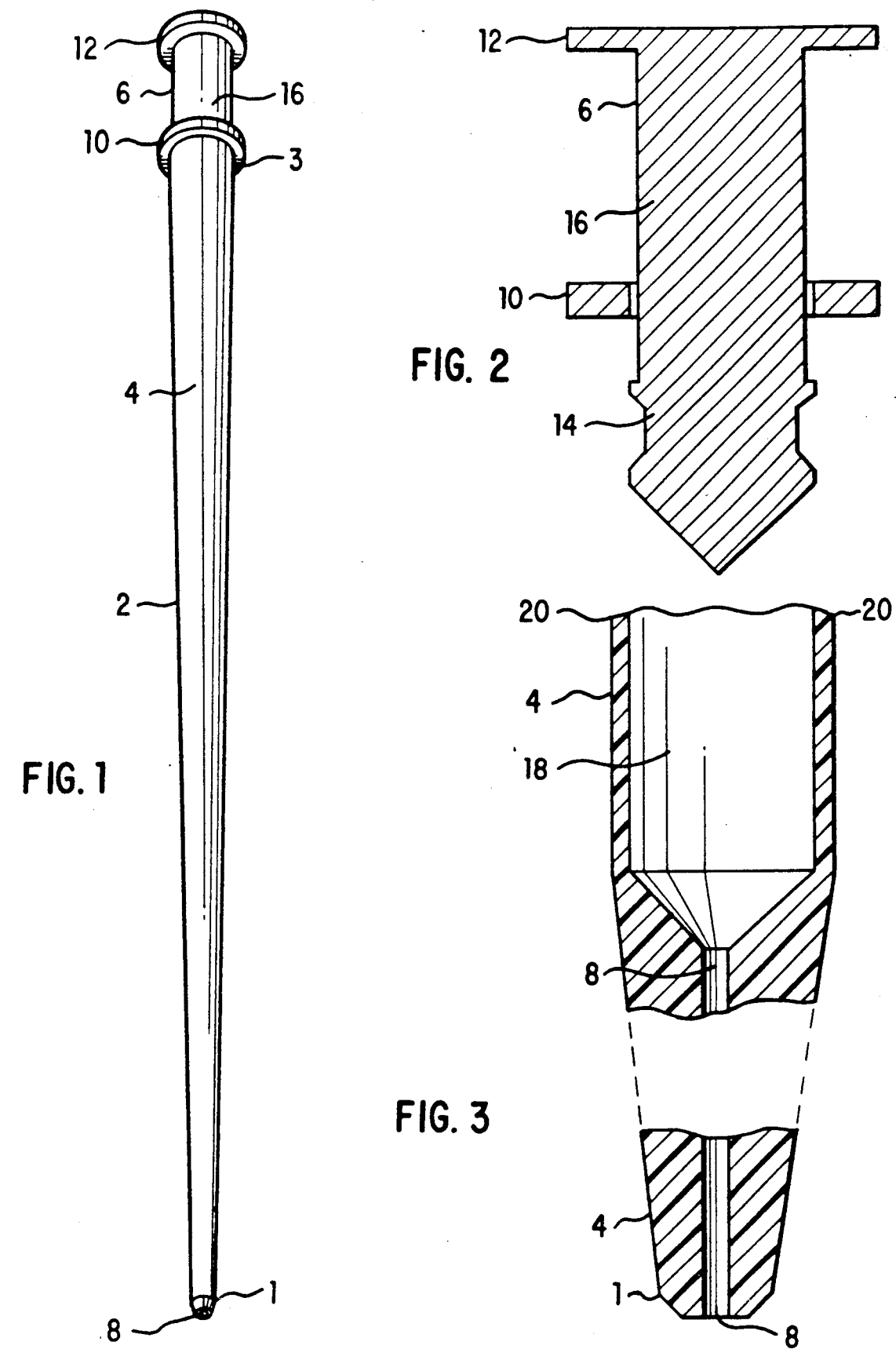

SWIMMING POOL LEAK DETECTOR

BACKGROUND OF THE INVENTION

This invention relates to swimming pools, specifically to locating water leaks in filled swimming pools.

SUMMARY OF THE INVENTION

The principle object of this invention is to provide a swimming pool leak detector so that a person does not have to submerge himself or herself and grope about under water to find a leak.

Another object is to provide a leak detector that is lightweight and can be manipulated by one hand.

An additional object is to provide a leak detector that is simple and easy to use.

A further object is to provide a leak detector that is economical in cost to manufacture.

To the accomplishment of the above and related objects, this invention may be embodied in the form illustrated in the accompanying drawings, attention being called to the fact, however, that the drawings are illustrativeonly and that changes may be made in the specific construction illustrated and described within the scope of the appended claims.

BRIEF DESCRIPTION OF THE DRAWING FIGURES

FIG. 1 is a perspective view of the invention.

FIG. 2 is an enlarged cross sectional view of the plunger.

FIG. 3 is an enlarged cross sectional view with parts broken away of the receiver.

DETAILED DESCRIPTION OF THE DRAWING FIGURES

Turning now descriptively to the drawings, in which similar reference characters denote similar references throughout the several views, FIG. 1 illustrates a device for detecting leaks in a filled swimming pool 2. The leak detector 2 consists of two parts, a receiver 4 which is a solid plastic rod about thirty-six inches in length and about one inch in diameter at its broadest part 3. The receiver 4 is tapered down to about one-half inch at its narrowest point 1. The receiver 4 is machined to resemble a billiard cue. At the receiver's 4 broadest part 3 a reservoir is machined vertically from the broad edge of the receiver 4 to a depth of about five inches to accommodate the second part of the invention, the plunger 6. A dye channel 8 is drilled from the tip of the leak detector 1 to the reservoir about thirty inches in length. The plunger 6 is retained within the reservoir by a retainer cap 10 which screws onto the receiver's 4 top edge. To operate the leak detector 2 the user depresses the plunger 6 to the bottom of the reservoir and fills the leak detector 2 by submerging the tip of the dye channel 8 into a dye solution and pulling upward on the plunger 6. The upward pulling draws the dye solution (food coloring) up through the dye channel 8 into the reservoir. With the reservoir filled with dye solution, the user enters the pool and from a standing position, (when the depth of the water allows) tests for leaks by placing the tip of the leak detector 1 closely to the point of the investigation. By pressing down on the plunger top 12 a small stream of the dye is released from the dye channel 8. If a leak is present at the point of investigation, the suction caused by the leak will draw the dye to the leak. The user of the leak detector 2 may operate the device with one hand by straddling the receiver 4 with the first two fingers below the cap retainer 10 and pressing down on the plunger tip 12 with the thumb, as a nurse would use a hypodermic needle.

Referring to the drawing in more detail and in the form of the invention shown in FIG. 1, FIG. 2 shows the plunger 6. The plunger 6 includes the plunger head 14 plunger shaft 16 plunger top 12 and the retainer cap 10. All are used as a means of drawing a dye solution into a reservoir and expelling same.

FIG. 3 shows the receiver 4 with the reservoir 18 and the dye channel 8. To assemble the swimming pool leak detector 2, insert the plunger head 14 into the reservoir 18 and slide the retainer cap 10 down the plunger shaft 16 onto the reservoir rim 20 which is threaded to receive the threaded retainer cap. When thusly assembled, the plunger head 14 is snugly contained within the reservoir 18 and the plunger 6 moves freely up or down. The bottom portion of FIG. 3 shows the receiver 4 at its narrowest point 1 and dye channel 8.

While certain novel features of this invention have been shown and described and are pointed out in the annexed claims, it will be understood that various admissions, substitutions and changes in the forms and details of the device illustrated and in its operation can be made by those skilled in the art without departing from the spirit of the invention.

What is claimed is:

1. A leak detector for the detection of a leak in a filled swimming pool, comprising:
   (a) a billiard-cue-shaped receiver having a handle end, a tip and a longitudinal axis, and containing a reservoir at the handle end, said receiver having a channel, the channel extending from the tip of said receiver to said reservoir; and
   (b) a plunger slidably disposed along the longitudinal axis within said reservoir within said receiver;
   wherein said plunger, when pulled outwardly away from the tip, may draw dye solution in which the tip has been immersed through the channel into the reservoir, and, when pushed inwardly toward the tip, may expel the dye solution from the reservoir through the channel; and
   wherein said leak detector, by expelling said dye solution near a leak in a filled swimming pool, will locate the leak due to the suction caused by said leak's drawing the dye solution toward said leak.

2. A method for the detection of a leak in a filled swimming pool, comprising:
   (1) obtaining a leak detector having:
      (a) a billiard-cue-shaped receiver, having a handle end, a tip and a longitudinal axis, and containing a reservoir at the handle end, said receiver having a channel, the channel extending from the tip of said receiver to said reservoir; and
      (b) a plunger slidably disposed along the longitudinal axis within said reservoir within said receiver;
   (2) immersing the tip in a dye solution and pulling the plunger outwardly away from the tip to draw dye solution through the channel into the reservoir;
   (3) placing the tip in the general vicinity of a suspected leak; and
   (4) pushing the plunger inwardly toward the tip to expel dye solution from the reservoir through the channel so that the movement of dye toward the leak will identify the location of such leak.

* * * * *